United States Patent Office 3,788,922
Patented Jan. 29, 1974

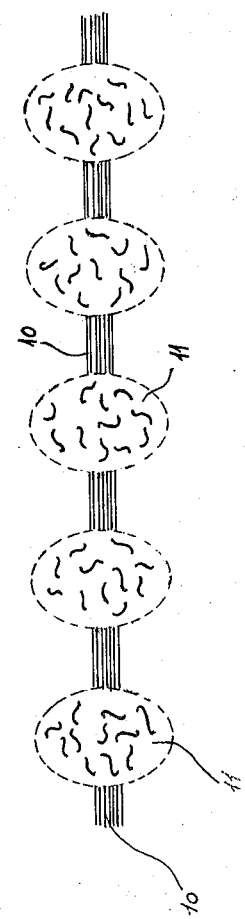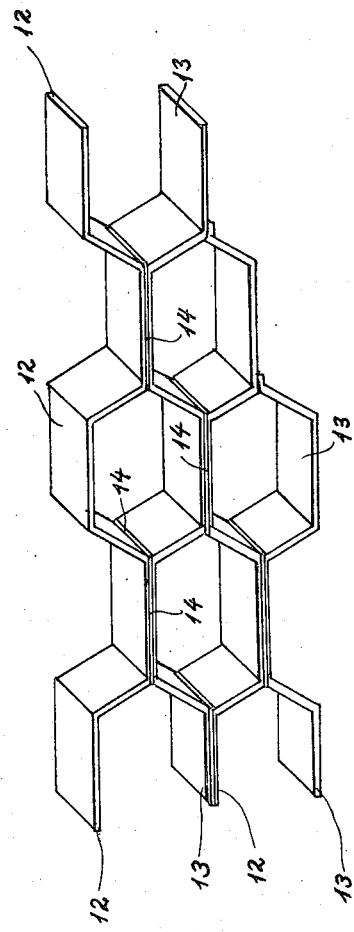

3,788,922
METHOD OF MANUFACTURING A LAMINATED FIBRO-FILAMENTARY OR FILM STRUCTURE WHICH IS PARTLY DELAMINATED
Ole-Bendt Rasmussen, 7 Topstykket,
DK–3460 Birkerod, Denmark
Filed July 21, 1971, Ser. No. 164,745
Claims priority, application Great Britain, July 21, 1970, 35,333/70
Int. Cl. B32b 7/04, 31/00
U.S. Cl. 156—244                                      9 Claims

ABSTRACT OF THE DISCLOSURE

Method of producing fibrous or sheet structure comprising melt coextruding a laminated structure comprising an assembly of two or more layers from polymeric material laminated together in intimate adherence with one another and simultaneously or subsequently so treating the assembly as to produce a regular pattern of areas of strong bonding separated by areas of weak or no bonding between the layers of the assembly.

---

A sheet or fibrous product comprising an assembly of three or more ribbon-like elements of polymeric material with adjacent elements bonded in face-to-face relationship at regular intervals along their length.

A sheet of fibrous product comprising three or more layers of polymeric material bonded to one another into an assembly at regular intervals along the length of the assembly and in which the or at least one of the inner layers of the assembly has a shorter surface length between adjacent bonds than the outer layers of the assembly, the outer layers thus having the form of loops.

U.S. Pat. No. 3,402,097 discloses a fibro-filamentary structure consisting of at least two components arranged in at least two layers, which are coextruded as a laminated filament and are subsequently partially delaminated. The treatments disclosed will produce a delamination at random. One of the components is an elastomer, the other being a hard polymer, and the composite material is oriented. After delamination and contraction of the elastomer, the two components will acquire very different lengths in each delaminated zone, and the alignment will hereby be distorted to form a bulky structure. However, as the original composite filament has readily delaminated at random, the residual bonds are rather weak.

In French Pats. Nos. 1,576,177, 1,576,178, and 1,548,247 single-layer or multi-layer filaments are produced by a combination of film coextrusion, subdivision of sheets or films, and cleavage of the stratified structures. In these methods there are first produced a sandwich-like sheet of several, usually many layers consisting of different components in interspersed relation with one another. The components are adapted to produce an easy cleaving, e.g. by rubbing action, either in the way that one of the components is disrupted or dissolved, or by cleaving-apart two layers at their interphase. There may be an alternation throughout the thickness of the sheet between stratified disruptable zones and bondings which are adapted to resist the disruption, and thus the final product can be a multi-component e.g. bi-component or tri-component) fibre with strong bonding between the layers. This is a very expedient way of manufacturing multicomponent fibres and filaments, especially when more than two layers are required.

The sub-division of the sandwich-like sheet can with advantage be carried out already in the extruder die by means of partitions, whereby the product leaving the die will be a layered filament or tape. Alternatively, the sub-division can also be carried out after solidification of the sheet, and even after the cleaving, e.g. by means of needle-rollers.

As regards the step of cleaving (delamination) the above-mentioned three French patents mention that it can be advantageous not to carry this out totally, but to let the product remain as a kind of network, as the interconnections may facilitate the handling of the product. However, the bonds which remain after this partial, random delamination will be weak bonds.

The idea behind the present invention is that the above-mentioned effects of partial delamination can be strongly accentuated or novel advantageous structures can be produced when the partial delamination is carried out in a suitable predetermined pattern instead of being at random.

The present invention relates in general to any method of manufacturing a fibro-filamentary or film structure by coextruding several layers to a laminated continuous structure and partially separating the layers from one another. Thus the layers can be formed as strips before they are joined in the process of coextrusion as by conventional conjugent filament-spinning in side-by-side relationship, or each layer in a layered stream can be sub-divided during the course of the coextrusion process, or the laminated, continuous structure may be a sheet, the layers of which may subsequently be formed as thin and narrow strips by means of needle-rollers or similar sub-division means, either before or after the partial separation, or the product may be maintained in form of a sheet.

The present invention is characterized by the step of coding said laminated structure for delamination at predetermined intervals along the length by forming in the structure before said delamination at least one layer of alternate adhesive properties, hereunder an interrupted layer. Hereby the "anatomy" of the fibro-filamentary or sheet structure can expediently be tailor-made to exhibit desired properties at its best, such as bulk, pliability, resilience, coherence between fibres for handling purposes, and evenness in network applications.

It is known, of course, to laminate separately extruded films by spot-wise fusing, but it is not known to carry out spot-lamination as a combination of multi-layered extrusion, "coding" and delamination. The simple spot-welding of separate films has, however, several limitations, in particular lack of speed, difficulties in forming very thin films separately, and difficulties in obtaining fine patterns.

An embodiment is characterized in that said layer for coding is formed by intermittent coextrusion. This is a particularly simple manner of carrying out the invention. Thus, the layers to partly become delaminated and partly remain laminated may be of incompatible components, whereby they readily can be split apart at their interphases. The intermittently coextruded component can in this case be an adhesive between said mutually incompatible materials, formed as an interrupted layer by intermittent feeding by means of a pulsating pump, a shutter-like device or the like. In order to obtain sharp-cut intermissions, the material for this layer should preferably exhibit a pronounced thixotropy. This can be obtained by addition of very finely grained powder.

Or the layers to partly become delaminated and partly remain laminated may consist of mutually compatible components or of one and the same component, whereby they form a durable bond. The intermittently coextruded component can in this case be a separating component formed as an interrupted layer. The separating component may, as known to the art, either be a polymer which is incompatible with at least one of the adjacent layers, or a very fragile polymer material, or a polymer material which can very readily be dissolved out, or a coextrudable paste- to claylike substance, which needs not be really polymeric.

As a further alternative, and no matter whether the adjacent layers are mutually compatible or incompatible, said intermittent coextrusion can be carried out in form of extrusion of a continuous segmental stream consisting of adhesive and separating material in alternate succession. This can in many cases produce sharper differences between the respective bonding strengths. Again, the intermittancy can be produced by pulsating pumps, by shutter-like devices or the like.

The above-mentioned embodiments have in common that the coding for delamination at intervals is a part of the coextrusion process, but it is also possible to code the structure after termination of the extrusion. Thus, another embodiment of the method according to the present invention is characterized in that said layer for coding is formed in the structure by first coextruding a continuous layer of a separating component which is fragile in solid state, subsequent to solidification hereof rupturing said layer at intervals and subsequent hereto contacting the adjacent layers through said ruptured areas and fusing them together in said areas. In this manner the intervals of strong and weak bonding can be particularly short, when desired, even at high production speeds. E.g. the rupturing at intervals can be carried out by zone-wise stretching between gear-wheels or gear-rollers, and the contacting and fusing together of said adjacent layers can be carried out by rolling and heating or by twisting and heating. The surfaces to be fused together must, of course, consist of identical or compatible materials. Optionally, there may be extruded minor amounts of a continuous adhesive layer on one or both sides of said layer of separating component. In order to avoid melting and distortion of the major layers while the strong adhesion is established, said adhesive component should preferably have lower melting point than the major component or components. The fragile component can e.g. be a blend of two incompatible and particularly stiff thermoplastic polymers.

Another example of coding the structure for delamination after termination of the extrusion process is to produce said layer for coding by coextruding a continuous layer and altering its adhesive properties at intervals by chemical change induced by varying or intermittent irradiation. The irradiation in question is preferably a beam or beams of accelerated electrons, and the variations can be produced by scanning or screening of the irradiation. Although this embodiment of the invention requires expensive equipment it is advantageous in certain cases when particularly short intervals of adhesion and/or delamination are required. The irradiation may either be adapted to cause an increase or decrease of the bonding strength. For this purpose a suitable additive such as a monomer or a catalyst should preferably be blended or absorbed in the layer in question. Thus, adhesion between two originally incompatible polymers can be produced or increased by suitable graft-polymerization, and reduction of the adhesion can be produced by degradation or by stiffening, e.g. by means of cross-linking.

As it appears from the introduction there may be coextruded many layers and it will generally be advantageous to form several or many layers each of which forms a coding for partial delamination. An embodiment is characterized in, when several layers for coding are formed, that there are interspersed herebetween layers which are adapted to form a continuous weak bonding. Said continuous weak bonding will make the laminated structure delaminate and form several separate filaments or nets, whereas the layers for coding cause a partial cleaving of the individual filament or net. Thus, it is possible to produce several or many composite filaments of a relatively complicated and advantageous structure from one coextruded body. This embodiment is in particular suitable in connection with the methods mentioned in the introduction in which the first formed product has form of a sandwich-like, fluid sheet.

The ways of forming the combination of coded layers and layers for continuous separation are as follows, viz:

If the codings are formed in the extrusion process, then each layer adapted to form a continuous weak bonding is produced by continuous extrusion. If the codings are formed by subsequent mechanical fracturing, then each layer adapted to form a continuous weak bonding is produced from a polymer which is not particularly fragile and is not fractured by the treatment.

The controlled delamination effected by coding of the bondings further makes it possible to give the individual "fringes" in the delaminated zones the form of bi- or multi-component fibres where the components adhere strongly to one another. To this end an embodiment is characterized in, when several layers for coding are formed, that herebetween there are interspersed layers which continuously form a strong bonding. This can be carried out in analogy to what is described above regarding interspersing of layers of continuous weak bondings between the coded layers.

As mentioned above the main objective of the invention is to tailor-make the "anatomy" of the fibro-filamentary or film structure for various purposes. To obtain a filament with the best combination of resilience and pliability there should preferably be three or more layers which are joined in clusters and delaminated herebetween (but as mentioned above, the "fringes" in the delaminated portions may have form of multi-component fibres).

To obtain this "anatomy," an embodiment of the method according to the invention is characterized in, when several layers for coding are formed, that the coding of adjacent layers for coding is brought in mutual registration.

Another desirable "anatomy" of the fibro-filamentary structure is that of a regular net. To obtain this, another embodiment is characterized in, when several layers for coding are formed, that the codings in adjacent layers for coding are brought in inverse registration. In this form the invention is suitable for production of non-woven fabrics. There can also be produced combinations between the cluster-forming anatomy and the net-formed anatomy.

British Pat. No. 1,172,669 discloses a method for producing a composite tubular sheet consisting of continuous lamellae, which are in interspersed relationship with one another, each forming an angle to the surface of the sheet, and having their continuous direction extending in generally helical manner in the tubular sheet. This lamellar configuration can, as indicated in the patent, be used as basis for partial splitting to a net. The present invention can also be applied with advantage on this method to form a regular net, preferably by means of interrupted coextrusion of a separating and/or adhesive component, hereby applying inverse registration between adjacent interrupted lamellae.

The present invention further relates to a novel fibrofilamentary or film product which can be produced by the method described in the foregoing. Said product consists of layers which are partly laminated and partly delaminated and is characterized in that the layers are ribbon-like, laminated surface to surface, and the laminated/delamination is established at intervals along the length in a predetermined pattern. The ribbonlike form of the layers has importance for the mutual bonding and for the visual effects and the cover.

An embodiment of the product is characterized by comprising more than two of said layers and in that said pattern establishes a network.

Another embodiment is characterized in that said layers are in mutually different state of shrinkage to form loops in the zones of delamination. The product has hereby acquired a high bulk.

A further development of said embodiment applicable to fibro-filamentary structures is characterized in that at least one of said layers is a multi-component structure in itself and that its shrinkage is in form of curling effected by the multicomponent structure.

The filamentary or film product with loops caused by differential shrinkage preferably comprises more than two of said layers, and to obtain the best "pile effect" of the loops, i.e. the highest volume, the lamination and delamination, respectively, of said layers should preferably be in mutual registration.

A very characterical fibro-filamentary product of this kind is further characterized in that the zones of registered delamination form ball-like segments. In order to obtain the highest volume of each ball, the layers which in the ball-zones are shrunk more and less, respectively, are preferably arranged in interspersed relationship with one another in the laminated zones.

Such filaments, or stable fibres made therefrom, having loop-or ball-formed "pile" are in particular suitable as filling material, e.g. in quilts and pillows, and in yarn where particular high volume is required, e.g. for long-pile carpets and hand-knit yarn.

The invention will now be described with further reference to the drawings of which FIG. 1 is a flowsheet of a preferred embodiment of the method.

Figure 5:
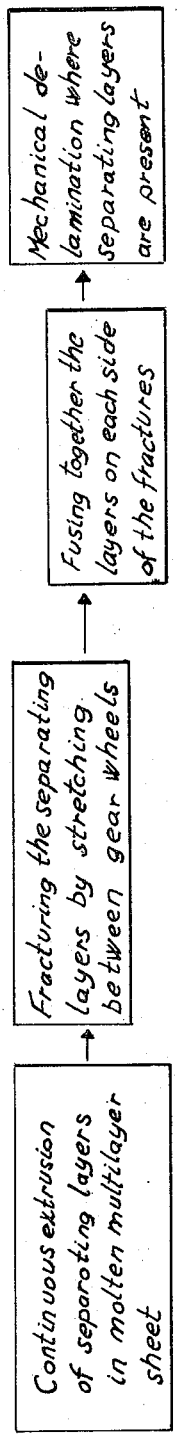
FIG. 5 is a flowsheet of a third embodiment of the method.
Figure 6:
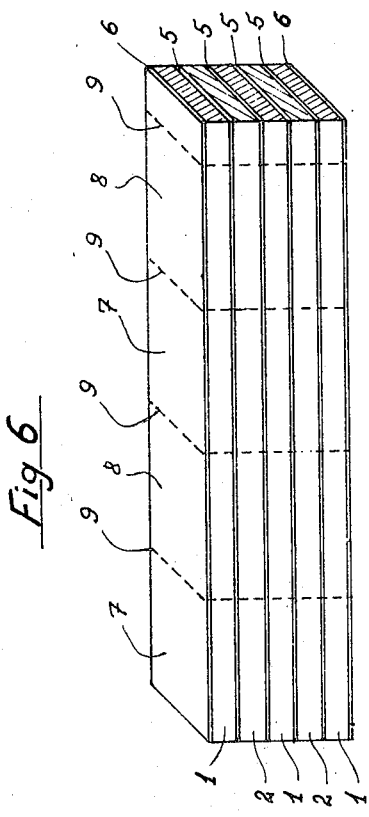

FIG. 6 which further demonstrates the process steps of FIG. 5 shows an intermediate product in perspective view.

FIG. 7 is a principal representation of a novel filament structure consisting of laminated segments and delaminated ball-like segments.

FIG. 8 is a perspective view of a netstructure resulting from the interruptions in adjacent adhesive layers are in inverse registration.

Figure 1:
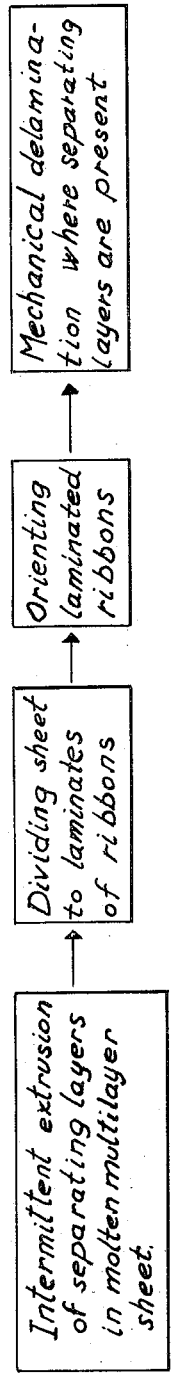

The extrusion step in FIG. 1 should preferably produce a sheet of many layers of different components interspersed in one another. The layered structure appears from FIG. 2. 1 and 2 are the major components which are compatible polymers so as to form a good adhesive bonding to each other. 3 is a separating component, e.g. a polymer which is incompatible with 1 and/or 2. Preferably, in order to facilitate the splitting, 3 is further a hard polymer. Finally, in order to secure a distinct interruption, 3 should preferably be pronouncedly tixotropic in the fluid state while it is extruded. This is achieved by admixing a fine powder, e.g. kaolin, which may be surface-treated in suitable manner to make it readily disperse in the polymer.

Figure 2:
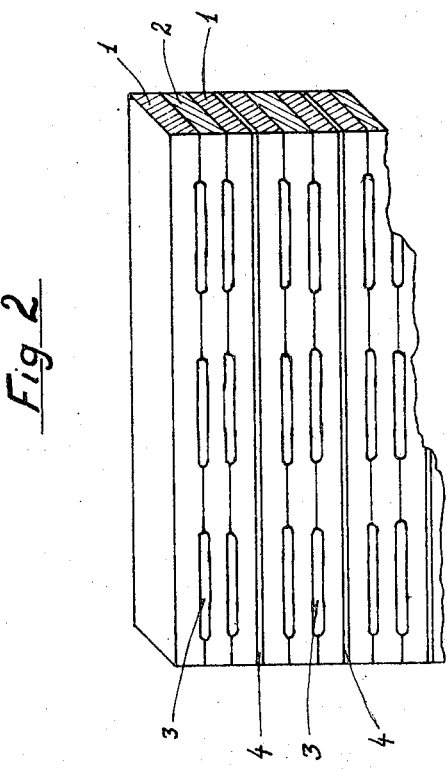
FIG. 2 shows, in perspective view, an intermediate product produced by the process line of FIG. 1, but before delamination.

The process line of FIG. 1 can either be used to produce separate filaments or a net analogous to that of FIG. 8. In case several (preferably many) separate filaments are produced from each divided sheet, there must also be continuous delamination planes. In FIG. 2 this is represented by continuous layers 4 of separating component.

The coextrusion of many layers from several components interspersed in one another is preferably carried out in molten state by the method described in French Pat. No. 1,548,247. The same method is also explained in an article in Textile Industries, July 1969, pp. 60–71. In this method, the components are extruded side-by-side in repeated sequence into an annular collecting chamber and are thereafter sheared out while they pass through said chamber. The new item in the present invention is that the separating component 3 is fed intermittently. This is preferably done by means of a quickly moved shutter-like valve arrangement behind the orifices for extrusion of the separating component 3 into said collecting die.

In FIG. 2 the separating layers 4 are shown as a minor component. However, 4 may just as well be a major component which is incompatible with, say 1, while 2 may be an adhesive component which may be present in small amounts only and serve to bond 1 and 4 together in the final filaments. In this case, a separation will occur in the planes where 1 and 2 contact each other directly.

The second step of FIG. 1, dividing sheet to laminates of ribbons, is preferably carried out by means of partitions at the end of the extrusion die, while the material is still molten. Hereafter, the laminated structure is extruded in form of many ribbons or thick filaments. This step is explained in French Pat. No. 1,576,178 and also in the above-mentioned article in Textile Industries.

The third step, orienting laminated ribbons, is necessary if a pronounced differential shrinkage is wanted, but can also be carried out after the step of partial delamination (cleaving).

The delamination (where separating layers are present) can usually best be carried out by means of rubbing, e.g. in several stations between sets of rubber rollers or rubber belts, moving at different velocities as disclosed in U.S. Pat. No. 3,427,654. However, the delamination can also take place spontaneously or by heating or swelling if the internal stresses produced by differential shrinkage are sufficient to produce delamination.

Figure 3:
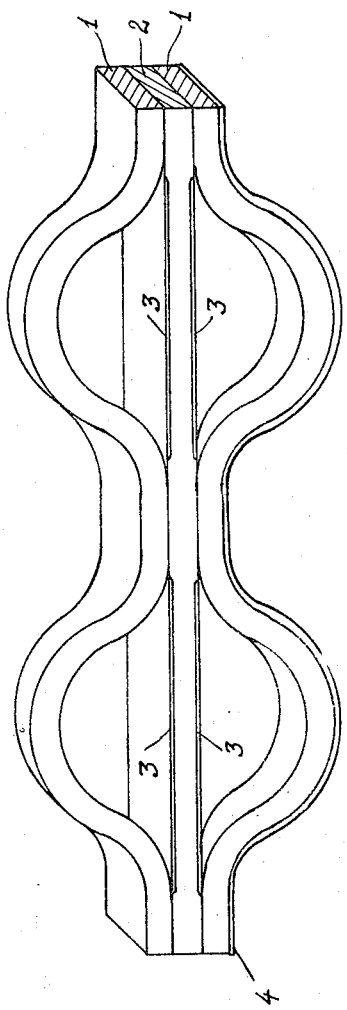
FIG. 3 shows principally the same product as shown in FIG. 2, but after delamination.

In FIG. 3 the structure of FIG. 2 has been disrupted, e.g. by rubbing between rubber aprons, and a bulk has developed by differential shrinkage. The layers are so arranged that the middle layer 2 shrinks more than the two surface layers 1 which hereby form loops. This "blossoming" may occur spontaneously upon the splitting, e.g. when 2 is an elastomer, and may in other cases be developed by heating or swelling. The layers of separating component 3 and 4—which may be either one and the same component applied in different manner, or different components—are here shown as still remaining in the final product and bonded to other layers. They may, however, be only loosely bonded in form of flakes, or may form separate flakes in the produced mass of fibro-filamentary elements, or may be removed either by dissolving out or by an aspirator.

Depending on the uses, the loops may be produced shorter or longer and more or less compacted. When bulk is the most desirable feature, as well the delaminated as the laminated portions should be as short as practically possible, e.g. between about 0.5 to 5 mm., the delaminated portions being measured in the contracted state.

The filament shown in the drawing extends in straight manner, but it will usually be advantageous to make the structure spiralize more or less by means of an asymmetry in the thicknesses or composition of the layers. The purpose of spiralization is to supply the filament with elasticity and to make the loops "project" out in different directions. The structure can be compared to the structure of the individual fibres of a down, which fibres are supplied with a "pile" of fine hairs. The loop-form of the "pile" on the present filaments materially improves the resilience of the volume, and the flat form of the looped layers also improves their ability to remain in a standing position. Thus, the structure in form of filaments or cut to staple is very suitable as a down substitute in pillows and the like, but also to obtain effects similar to chenille yarn. The thickness of each ribbonlike layer may, e.g. be between 0.002 to 0.02 mm., while the width may be between 0.01 to 0.5 mm.

Figure 4:
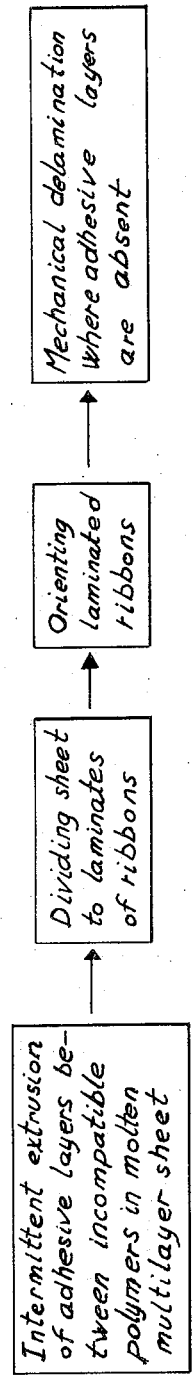
FIG. 4 is a flowsheet of another preferred embodiment of the method.

The process line shown in FIG. 4 is analogous to that of FIG. 1, but uses intermittent extrusion of an adhesive instead of a separating component. FIG. 2 also applies in this case if 3 is understood as an adhesive, and 1 and 2 are understood as incompatible polymers, which will separate when the sandwich is bonded and/or rubbed in solid state. In this case the continuous separating layers 4 can, of course, be avoided, but will in some cases be suitable anyway.

In the embodiment illustrated by FIGS. 5 and 6 the "coding" for partial delamination is carried out subsequent to the coextrusion. Apart from the fact that all layers are coextruded as continuous layers, the step of extrusion and the step of dividing the sheet to laminates of ribbons are carried out as explained in connection with FIGS. 1 and 2.

In FIG. 6, 1 and 2 still indicate the major components which are here understood as compatible materials. They may also be incompatible, but then there is need for adhesive layers, which are not shown. 5 and 6 are two different separating components. 5 should be very fragile in solid state, e.g. a blend of two rigid, incompatible polymers, as both incompatibility and rigidity tend to make a polymer material fragile. The layers 6 on the other hand should be less rigid so that they can be stretched under conditions where 5 are ruptured.

After extrusion and dividing of the film-formed layers to ribbonlike layers, the layers 5 are fractured and the rest of the sandwich stretched in the zones 7, while the layers 5 are left continuous and the rest of the sandwich generally unstretched in the zones 8. The borders between the two sets of zones are indicated by the dotted lines 9. This fracturing at intervals is preferably carried out by means of gear wheels or gear rollers or similar devices. The other layers of separating component 6 must not be fractured during this treatment.

At the places where the layers 5 are ruptured, 1 and 2 are contacted and fused together. This can be done by heating and twisting. The layered structure has now become coded to delaminate in the zones where the layers 5 were not ruptured during the former step and to resist delamination where 1 and 2 have been fused together through the ruptures in 5. The layers 6 will still form continuous split-planes. Again, the final delamination should usually be carried out by rubbing between rubber aprons or the like.

Depending e.g. on the brittleness of layers 5 and on the length of the zones 7 the fracturing may occur in one of two manners, either each layer 5 may form substantially one fracture in each zone 7 and withdraw from substantially all the zone 7, or each layer 5 may form several fractures and leave several "inlands" of separating component within each zone 7.

In the latter case the "laminated zones" will of course in reality be partly delaminated, but in a very fine-patterned manner and will form a kind of cellular structure. In case the major components of the laminate consist of different polymer materials, the fine cells of this structure may also "blossom" and form a relatively voluminous filament portion. If the laminated film or filament containing said brittle layers are stretched continuously instead of at intervals, the product, after twisting or rolling and fusing through the ruptures, will acquire such a cellular structure all over. This is a suitable method of producing cellular filaments or films, an important advantage being that the cell-walls are continuous layers of even thickness.

In a stretchable sandwich-structure, the fragility of individual layers is also dependent on their thickness, the stretchability being increased with decreased thickness of said layers, and thus 5 and 6 may in certain cases be made from the same polymer provided that the layers 6 are thinner than 5.

The structure of the very schematilized FIG. 7 is a further development of that of FIG. 3. It consists of a relatively high amount of ribbonlike layers from two or more components which are laminated in the segments 10 and delaminated in the "ball-shaped" segments 11. The ball-shape is a result of the different types of layers being differently shrunk and being interspersed with one another, when referring to the laminated segments 10, in a generally alternate succession. This novel structure represents an unusual combination of a softness, resilience, thermal insulation and bulk. There should generally be about 8 to 50 layers in each filament, and the dimensions of the layers as well as the lengths of the zones should generally be in the orders of magnitude described in connection with FIG. 3. There may be built-in an asymmetry to let the filament spiralize.

Said filament "anatomy" can be produced by either of the process lines shown in FIGS. 1, 4, and 5, using a much higher number of intermittent layers than the number of continuous splitting planes. It will be understood that the interruptions must be in registration with one another.

When chopping this filament to staple, it is generally advantageous to control the cutting to go through the delaminated segments only.

In FIG. 8 two major components 12 and 13 have been coextruded with intermittent extrusion of layers of an adhesive 14 as in the process line of FIG. 4, but with the special feature that adjacent layers of adhesive 14 have been extruded in inverse registration so as to code the laminated structure to form a regular net after delamination. In similar manner there can be used intermittent extrusion of separating layers (viz. FIG. 1) when the intermissions are in inverse registration.

In the foregoing, the method according to the present invention has been explained with particular reference to production of fibro-filamentary products, although film and sheet material, which is partly delaminated at predetermined intervals, are mentioned as possible intermediate products. However, it must be understood that due to pliability, bulk and visual effects, such partly delaminated and preferably "blossomed" film or sheet materials can be used with advantage as end products, e.g. as wrapping material.

EXAMPLE 1

This example illustrates the production of a net-formed yarn by means of intermittent extrusion of a separating component from two different feed systems which pulsate in different phase.

The extrusion die used is that shown in the article in Textile Industries, July 1969, pp. 60–71. In less detailed form this device is also shown in FIG. 5 of French Pat. No. 1,576,178 in combination with FIG. 7 of the same patent. However, the die is modified to extrude three instead of two components interspersed in one another. 80 tapes are extruded simultaneously, each having the layer configuration on principle shown in FIG. 2 of said French patent specification.

There is used three extruders, each feeding a separate "manifold" in the die. One feeds nylon 6 while both others feed a separating component consisting of polystyrene blended with 10% of a commercial kaolin type which is surface treated for ready dispersion in polyhydrocarbons. The blending is carried out in a planetary screw extruder prior to the coextrusion. The purpose of the kaolin is to secure sharp interruptions. The nylon 6 as well as the blended polystyrene have melt index 1 according to ASTM D1238–62T, condition K.

Calling the two different feeding systems for separating component "sep 1" and "sep 2," the sequence in the layer buildup is as follows:

sep 1, nylon, sep 2, nylon, sep 1, nylon, sep 2

Between each of the extruders for separating component and the extruder die there is inserted a heated piston. The length of stroke of each piston is variable, and the two pistons are in opposite synchronization. The amplitudes are so adapted that there are produced distinct interruptions in each layer of separating component, but the interruptions are shorter than the real segments of each separating layer.

The 80 ribbons of "lamellar" configuration are extruded downwards into a water-bath, subsequently drawn at a ratio of 3:1 and fibrillated between rubber aprons as disclosed in British Pat. No. 1,155,961. The total capacity of extrusion is 10 kg. per hour, divided as mentioned on 80 ribbons. The final denier of each oriented and split ribbon is 1.000. The number of pulsations is 2 per second, corresponding to a distance of 16 cm. in the final yarn.

The resultant net structure of the yarn makes twisting unnecessary.

EXAMPLE 2

This example illustrates the use of intermittent extrusion of adhesive layers and further illustrates the production of a yarn which consists of laminated and delaminated segments in sequence, and where the delaminated segments are relatively randomized due to different shrinkage of different layers.

There is used the same extrusion die as in Example 1, but with the following modifications:

(a) a pulsating piston is only used for one of the three components
(b) the manifolds for the three components are changed so as to produce the sequence which will appear from the following
(c) the number of exit orifices is increased from 80 to 140.

The rest of the production line is unchanged.

The two major components are nylon 6 and polypropylene with admixture of 20% high density polyethylene, each forming 45% of the total extrusion. The last 10% is formed by the intermittently extruded layers, which act as adhesive and are formed of a copolymer from ethylene and Zn-acrylate (trade name Surlyn Z), thoroughly blended in the planetary screw extruder with 5% kaolin. All three components have melt index 1 according to ASTM D1238-62T, condition K.

The sequence in the buildup of layers is as follows:

nylon, adhesive, p.p., adhesive, nylon,
adhesive, p.p., adhesive, etc.

but the adhesive is omitted at every 10th interphase between nylon and polypropylene.

The extrusion capacity, stretching ratio, final yarn denier and frequency of pulsations are as in Example 1. The resultant distance between the sequences coded in by means of the pulsations, is 10 cm. Finally, the delaminted polypropylene layers are shrunk by heating to 140° C.

EXAMPLE 3

This example illustrates a coding after termination of the extrusion. The structure produced is generally as in Example 2, but with finer distances between the segments.

The die used is on principle as in the other examples, but modified to use 4 components from 4 different extruders.

The components are as follows:

(a) nylon 6
(b) nylon 11
(c) polystyrene and polymethacrylate intimately blended in proportions 50/50 in a planetary screw extruder
(d) polypropylene.

All components have melt index 1 according to ASTM D1238-62T, condition K.

Component (c) is selected for coding of the adhesion/dehesion while (d) is selected for a continuous dehesion. With reference to FIG. 6, the manifolds are adapted to produce the following sequence:

(d), (a), (c), (b), (c), (a), (d), (a), (c), (b), (c), etc.

After extrusion, but before orienting the tapes of "lamellar" configuration are rolled between a set of gear rollers, the division between the cogs of each roller being 3 mm. Hereby the separating layers (c) will be repeatedly fractured, while the other separating layers (d) will withstand the treatment.

In succession hereto each tape is twisted 1 turn per cm. in a false-twist process, while heated to 190° C. in an oven. Fusing will thereby take place through the fractures. Having left the false-twist device and lost the twist, each tape is oriented at a ratio of 2:1 and split to filamentary structures which after heat shrinkage at about 160° C. generally will have the form shown in FIG. 3.

What I claim is:

1. Method of manufacturing a fibro-filamentary or film structure by coextruding a plurality of layers to form a laminated continuous multi-layer sandwich structure and discontinuously separating the layers from one another, characterized by the step of coding said laminated structure for separation at predetermined intervals along the length by forming in the structure before said separation at least one layer of discontinuous adhesive properties.

2. Method according to claim 1 characterized in that said layer for coding is formed by intermittent coextrusion.

3. Method according to claim 2 characterized in that the intermittent coextrusion is carried out in form of extrusion of a continuous segmental stream consisting of adhesive and separating material in alternate succession.

4. Method according to claim 1 characterized in that said layer for coding is formed in the structure by first coextruding a continuous layer of a separating component which is fragile in solid state, subsequent to solidification hereof rupturing said layer at intervals and subsequent hereto contacting the adjacent layers through said ruptured areas and fusing them together in said areas.

5. Method according to claim 1 characterized in that said layer for coding is producing by coextruding a continuous layer and altering its adhesive properties at intervals by chemical change induced by varying or intermittent irradiation.

6. Method according to claim 1 characterized in, when said plurality of layers for coding are formed, that there are interspersed herebetween layers which are adapted to form a continuous weak bonding.

7. Method according to claim 1 characterized in, when said plurality of layers for coding are formed, that there are interspersed herebetween layers which continuously form a strong bonding.

8. Method according to claim 1 characterized in, when said plurality of layers for coding are formed, that the codings of adjacent coded layers are brought in mutual registration.

9. Method according to claim 1 characterized in, when said plurality of layers for coding are formed, that the codings in adjacent coded layers are brought in inverse registration.

References Cited

UNITED STATES PATENTS

| | | | |
|---|---|---|---|
| 3,247,039 | 4/1966 | Schultheiss | 156—244 X |
| 3,366,525 | 1/1968 | Jackson | 156—289 X |
| 3,494,993 | 2/1970 | Breidt et al. | 264—171 X |

WILLIAM A. POWELL, Primary Examiner

U.S. Cl. X.R.

156—85, 197, 289, 290, 344; 161—68, 137, 148